(12) United States Patent
Seibold

(10) Patent No.: US 9,428,326 B2
(45) Date of Patent: Aug. 30, 2016

(54) PORTABLE WATER SUPPLY

(71) Applicant: Marlido, LLC, Darien, CT (US)

(72) Inventor: William Seibold, Darien, CT (US)

(73) Assignee: Marlido, LLC, Darien, CT (US)

( * ) Notice: Subject to any disclaimer, the term of this patent is extended or adjusted under 35 U.S.C. 154(b) by 0 days.

(21) Appl. No.: 14/295,281

(22) Filed: Jun. 3, 2014

(65) Prior Publication Data

US 2015/0344176 A1    Dec. 3, 2015

(51) Int. Cl.
*B65D 19/42* (2006.01)
*B65D 85/72* (2006.01)
*E03B 11/02* (2006.01)

(52) U.S. Cl.
CPC ............... *B65D 85/72* (2013.01); *E03B 11/02* (2013.01)

(58) Field of Classification Search
CPC . B60P 3/426; B65D 19/42; B65D 19/00711; B65D 77/061
USPC ................... 280/47.18, 47.26, 79.2
See application file for complete search history.

(56) References Cited

U.S. PATENT DOCUMENTS

| | | | |
|---|---|---|---|
| 2,437,618 A | 3/1943 | Schottgen et al. | |
| 3,734,525 A | 5/1973 | Rimbey | |
| 4,276,767 A | 7/1981 | Cartwright | |
| 4,401,239 A | 8/1983 | Thomassen | |
| 4,560,090 A | 12/1985 | Okushita | |
| 4,573,508 A | 3/1986 | Knaus | |
| 4,640,328 A | 2/1987 | Arney | |
| 4,903,864 A | 2/1990 | Sirhan | |
| 5,148,939 A | 9/1992 | Roser | |
| 5,269,414 A | 12/1993 | D'Hollander | |
| 5,289,937 A | 3/1994 | Boots | |
| 5,405,234 A | 4/1995 | Ziaylek, Jr. et al. | |
| 5,437,384 A | 8/1995 | Farrell | |
| 5,482,179 A | 1/1996 | Bruhn | |
| 5,497,897 A | 3/1996 | Alack et al. | |
| 5,564,599 A * | 10/1996 | Barber ................ | B65D 77/061 206/600 |
| 5,722,552 A | 3/1998 | Olson | |
| 5,746,343 A | 5/1998 | Waltke et al. | |
| 5,799,818 A | 9/1998 | Ringer | |
| 5,819,773 A | 10/1998 | Kronowitt | |
| 5,853,581 A | 12/1998 | Rayborn et al. | |
| 5,979,685 A | 11/1999 | Schuetz | |
| 5,979,972 A | 11/1999 | Gehman | |

(Continued)

OTHER PUBLICATIONS

Abraham et al., "School Health," (2005).

(Continued)

*Primary Examiner* — Bryan Evans
(74) *Attorney, Agent, or Firm* — Eric L. Sophir; Dentons US LLP

(57) ABSTRACT

Embodiments of the disclosed invention provide for a wheeled apparatus suitable for storing liquids, such as water for consumption, when ordinary drinking water may be scarce or unavailable. Embodiments disclosed herein can be collapsed and stored in a small profile arrangement during periods when the apparatus is not in use. Embodiments may comprise wheels so that the apparatus may be assembled in one location and rolled to a water source, and rolled to shelter when full of water. Embodiments may provide a hose to connect the apparatus to a standard household faucets or spigots. Once the present invention is filled, it can be rolled to storage location while awaiting future needs. After an emergency situation passes, the apparatus may be drained and re-packed for storage.

32 Claims, 15 Drawing Sheets

(56) References Cited

U.S. PATENT DOCUMENTS

| | | | |
|---|---|---|---|
| 5,997,737 A | 12/1999 | Sturdevant et al. | |
| 6,152,707 A | 11/2000 | Alberg | |
| 6,182,453 B1 | 2/2001 | Forsberg | |
| 6,220,474 B1 | 4/2001 | Bedon | |
| 6,390,331 B2 | 5/2002 | Schutz | |
| 6,401,953 B2 | 6/2002 | Kofod | |
| 6,474,759 B2* | 11/2002 | Hsu | A47B 47/042 312/108 |
| 6,681,956 B2 | 1/2004 | Bolgar | |
| 6,694,739 B2 | 2/2004 | Beckius et al. | |
| 6,726,052 B1 | 4/2004 | Miller | |
| 6,902,061 B1 | 6/2005 | Elstone | |
| 7,014,077 B2 | 3/2006 | Brown | |
| 7,021,242 B2* | 4/2006 | Axelrod | A01K 1/0245 119/496 |
| 7,036,676 B2 | 5/2006 | Christensen | |
| 7,090,779 B2 | 8/2006 | Bernstein et al. | |
| 7,188,747 B2 | 3/2007 | Bennett et al. | |
| 7,308,989 B2 | 12/2007 | Zheng | |
| 7,311,829 B2 | 12/2007 | Roffman et al. | |
| 7,350,670 B2 | 4/2008 | Steeves et al. | |
| 7,360,784 B2* | 4/2008 | Stewart | B60J 7/1614 220/4.16 |
| 7,389,909 B2 | 6/2008 | Crosland et al. | |
| 7,500,442 B1 | 3/2009 | Schanz | |
| 7,681,783 B2 | 3/2010 | Stephenson | |
| 7,699,186 B2 | 4/2010 | Zheng | |
| 7,708,186 B2 | 5/2010 | Pawlick | |
| 7,762,393 B2 | 7/2010 | Schutz | |
| 7,819,274 B2 | 10/2010 | Fripps | |
| 7,841,289 B1 | 11/2010 | Schanz | |
| 7,905,368 B1 | 3/2011 | Christensen | |
| 7,938,291 B2 | 5/2011 | Christensen | |
| 7,957,947 B2 | 6/2011 | Odi | |
| 8,017,701 B2 | 9/2011 | McElvain et al. | |
| 8,133,400 B2 | 3/2012 | Kee et al. | |
| 8,162,180 B2 | 4/2012 | Lips | |
| 8,303,899 B2 | 11/2012 | McElvain et al. | |
| 8,313,644 B2 | 11/2012 | Harris et al. | |
| 8,543,242 B2 | 9/2013 | Odi | |
| 8,562,791 B2 | 10/2013 | Riley et al. | |
| 8,569,433 B2 | 10/2013 | McElvain et al. | |
| 2003/0070430 A1 | 4/2003 | Beckius et al. | |
| 2004/0244996 A1 | 12/2004 | Kravkov | |
| 2006/0019047 A1 | 1/2006 | Giori et al. | |
| 2006/0157343 A1 | 7/2006 | Herrington | |
| 2006/0180643 A1 | 8/2006 | Stephenson | |
| 2008/0105678 A1 | 5/2008 | Regan et al. | |
| 2008/0237101 A1 | 10/2008 | Roussel et al. | |
| 2008/0283525 A1 | 11/2008 | Heider | |
| 2009/0019882 A1* | 1/2009 | Vanderberg | B62B 3/003 62/457.7 |
| 2009/0078700 A1* | 3/2009 | Boivin | B65D 19/42 220/4.28 |
| 2009/0166368 A1 | 7/2009 | Regan et al. | |
| 2009/0313996 A1 | 12/2009 | Riley et al. | |
| 2010/0000995 A1* | 1/2010 | Yarbrough | B65D 25/16 220/212 |
| 2010/0254633 A1 | 10/2010 | Andochick | |
| 2010/0308047 A1 | 12/2010 | Regan et al. | |
| 2011/0011273 A1 | 1/2011 | Evers et al. | |
| 2011/0056519 A1 | 3/2011 | Card et al. | |
| 2011/0215054 A1 | 9/2011 | Lantis et al. | |
| 2012/0132650 A1* | 5/2012 | Buonerba | B60P 3/426 220/1.6 |
| 2012/0241448 A1 | 9/2012 | Claeys | |
| 2012/0251388 A1 | 10/2012 | Case, III et al. | |
| 2012/0267232 A1 | 10/2012 | Riley et al. | |
| 2013/0037114 A1 | 2/2013 | Sudhalkar | |
| 2013/0056899 A1 | 3/2013 | McElvain et al. | |
| 2013/0127074 A1 | 5/2013 | Riley et al. | |
| 2013/0263789 A1 | 10/2013 | Delman | |

OTHER PUBLICATIONS

Bloomquist, R.G., "Geothermal District Energy System Analysis, Design, and Development." Text-book of European Summer School on Geothermal Energy Applications (2001): pp. 213.

Gingrich, J.B. et al., "Regional Disease Vector Ecology Profile East Asia." Armed Forces Pest Management Board Washington DC, (2002).

Makel, W.J. et al., "Cleaning Recreation Sites." United States Department of Agriculture, Forest eService, Technology and Development Program, (1996).

Manghi, N., "Drinking water contamination at household low-income countries and improved storage solutions." (2005).

McAllister, F.A., "Apollo Experience Report-Crew Provisions and Equipment Subsystem." NASA Technical Note 2 (1972): 1.

Neveril et al., "Water Container Liner" (1967).

Nieuwoudt et al., "A Disinfectant Dispenser for Use with Portable Water Containers in Rural Areas" (2005).

Roberts et al., "Marine Corps Shelterized Expeditionary Food Service System". Army Natick Research and Development Center, MA, (1980).

Sobsey et al., "Managing water in the home: accelerated health gains from improved water supply". Geneva: World Health Organization, (2002).

"Water Treatment: Water Treatment and Examination", LDS Preparedness Manual (1972): 47.

International Search Report and Written Opinion dated Aug. 14, 2015, corresponding to International Patent Application No. PCT/US2015/031871, 11 pages.

* cited by examiner

BACK

FRONT

PORTABLE WATER SUPPLY

FIELD OF THE DISCLOSURE

The present invention relates to fluid storage and more specifically relates to water storage and portability.

BACKGROUND

As fluid storage tanks are filled, mobility becomes difficult by human force alone as weight increases. In times of emergencies, such as after natural disasters, a small scale, mobile, dedicated, and rapidly fillable source of potable water is often required. Storage tanks having sufficient capacity allowing users to prepare an emergency water supply may be too heavy to easily move from a water source to shelter. FEMA suggests that a family of four requires one liter of water per person, per day, to comfortably survive for two weeks. The volume of such a tank sufficient to hold this amount of water, roughly 56 liters, can be heavy and difficult to keep sanitary. Filling a tank with such a substantial amount of water can be time consuming. In some cases, water sources available to citizens that can fill a storage tank are limited to a faucet or spigot. Filling tanks from such sources may be time consuming. Filling tanks from such sources may also limit the size of the storage means capable of receiving water from such as source, for example a bucket. In emergency situations, however, time may be limited.

What is needed is a readily available apparatus for storing an emergency supply of potable water extracted from a common household faucet or spigot. What is also needed is for such an apparatus to be fillable in a relatively short period of time.

In situations commonly requiring emergency water provisions, such as before a bad weather event, citizens often buy large stores of bottled water in anticipation. This can be expensive, and may distract from other needs when preparing for an impending emergency.

What is needed is a storage means mitigating the substantial time, money and storage space required to procure and store flats of water that are purchased in anticipation of disasters and water interruption.

Storage means known in the art, such as bathtub water bladders and large water tanks, are susceptible to waste, spillage and mess. Known storage means for storing emergency water supplies are often located at a great distance from where the majority of water is consumed for drinking and cooking, such as the kitchen or dining room. In known storage tools, repeated instances of mobilizing the water from storage areas to consumption areas often invites spillage and/or contamination.

In emergency situations, high-rise apartment homes that lose power can also lose electricity-driven water pressure. For residents of high-rise apartment homes, particularly those who live on higher-floors, it may be impracticable to move the requisite amount of water quickly, safely, and without contaminating the water supply.

For residents of suburban and rural communities, when natural disasters strike local water supplies can be temporarily unavailable or contaminated. Often alternative water sources are not possible due to road closures, floods, snow, distances, and/or debris.

In some cases, it may even be useful for municipalities and other government agencies to distribute storage tanks to its citizens following natural disasters. Such large-scale water distribution may reduce the amount of time lost to provide potable water rations and reduce that amount of water spilled by distributing water in small, makeshift water receptacles. Municipalities and other government agencies may distribute the present invention to groups of citizens to provide temporary and safe supplies of water to their citizens.

What is needed is a means for providing an emergency potable water supply that is easily movable. What is needed is a collapsible and/or storable apparatus for transporting, storing, and dispensing water. What is needed a storable apparatus that is readily assembled and filled with potable water before, during, and/or after natural disasters or other emergency scenarios. What is needed is a water storage apparatus providing large scale liquid storage that can be easily moved, in a compact, stable format, from the filling source to other areas despite the large weight of an apparatus that is filled with potable water.

SUMMARY

Embodiments described herein may include a wheeled apparatus suitable for storing liquids, such as potable water for consumption, during periods when ordinary drinking water may be less available or unavailable. Embodiments of the apparatus may be collapsed and stored in a small profile arrangement. Embodiments of the apparatus may be assembled in one location and rolled to a water source using enclosed wheels. Some embodiments may provide for a detachable coupling with a hose to connect embodiments of a water storage apparatus to a water source, such as a household faucet.

In one embodiment, a water storage apparatus comprises a base comprising a lower horizontal surface, one or more wheels removably attached to the base, a plurality of walls extending upwardly from edges of the lower horizontal surface, thereby forming a recess in the base defined by the walls and the lower horizontal surface, wherein at least one of the plurality of walls has a hole configured to be detachably coupled to a fluid dispenser; an upper portion comprising an upper horizontal surface having a plurality of walls extending downwardly from edges of the upper horizontal surface, thereby forming a recess in the upper portion defined by the walls of the upper portion and the upper horizontal surface, wherein the upper horizontal surface comprises a hole; a plurality of removable panels extending from the base to the upper portion forming a chamber defined by the plurality of removable panels, the base, and the upper portion, wherein the removable panels are configured to fit in a housing defined by the recess of the base and the recess of the upper portion when the base is adjacent to the upper portion; and a flexible bladder comprising an orifice substantially aligned with the hole in the upper horizontal surface.

In another embodiment, a water storage apparatus comprises a base comprising a lower horizontal surface, one or more wheels removably attached to the base, a plurality of walls extending upwardly from edges of the lower horizontal surface, thereby forming a recess in the base defined by the walls and the lower horizontal surface, wherein at least one of the plurality of walls has a hole configured to be detachably coupled to a fluid dispenser; an upper portion comprising an upper horizontal surface having a plurality of walls extending downwardly from edges of the upper horizontal surface, thereby forming a recess in the upper portion defined by the walls of the upper portion and the upper horizontal surface, wherein the upper horizontal surface comprises a hole; a plurality of removable panels extending from the base to the upper portion forming a chamber defined by the plurality of removable panels, the base, and the upper portion, wherein the removable panels are configured to stack upon one another between the base and the upper portion whereby the base is adjacent to a first end of the stack and the upper portion is adjacent to an opposing second end of the stack; and a flexible bladder comprising an orifice substantially aligned with the hole of the upper horizontal surface.

BRIEF DESCRIPTION OF THE DRAWINGS

The present disclosure can be better understood by referring to the following figures. The components in the figures are not necessarily to scale, emphasis instead being placed upon illustrating the principles of the disclosure. In the figures, reference numerals designate corresponding parts throughout the different views.

DETAILED DESCRIPTION

Figure 1:
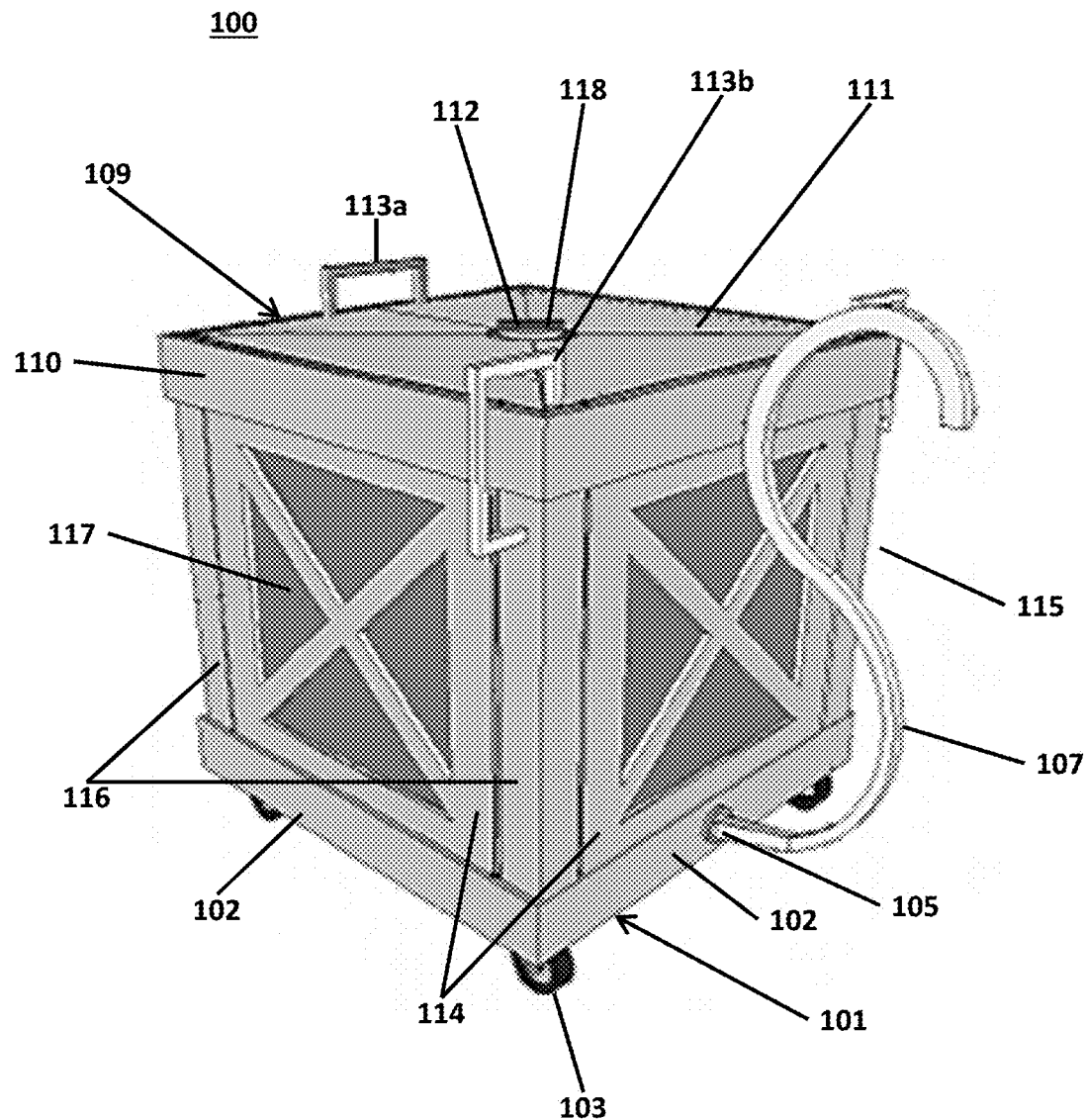
FIG. 1 shows an exemplary embodiment of a water storage apparatus.

The present invention is here described in detail with reference to embodiments illustrated in the drawings, which form a part here. Other embodiments may be used and/or other changes may be made without departing from the spirit or scope of the present disclosure. The illustrative embodiments described in the detailed description are not meant to be limiting of the subject matter presented here.

Embodiments may provide a readily available capability to store an emergency supply of potable water from any house faucet or spigot, in a short period of time. In some embodiments, the capacity of this supply may meet or exceed the FEMA-suggested 14-liter per person amount (56 liters for a family of four), and without sacrificing mobility or safety.

Embodiments may provide a rapidly fillable source of potable water that municipalities or other government agencies may distribute to citizens following disasters and in other emergencies. Such embodiments may facilitate water distribution to citizens in larger amounts thereby reducing waste and contamination in makeshift receptacles (e.g., buckets).

Reference will now be made to the exemplary embodiments illustrated in the drawings, and specific language will be used here to describe the same. It will nevertheless be understood that no limitation of the scope of the invention is thereby intended. Alterations and further modifications of the inventive features illustrated here, and additional applications of the principles of the inventions as illustrated here, which would occur to one skilled in the relevant art and having possession of this disclosure, are considered within the scope of the invention.

FIG. 1 shows an exemplary embodiment of a water storage apparatus 100 having a base 101, an upper portion 109, and panels 114 extending from the base 101 to the upper portion 109 forming a chamber 115 for housing a bladder 117 capable of storing fluids.

The base 101 has side walls 102 and wheels 103. A side wall 102 of the base may comprise a hole 105 through which a fluid dispensing attachment may be detachably coupled, such as a hose 107 or a spigot. As shown in FIG. 1, the exemplary hose 107 may comprise corners so as to have substantially rectangular shape, but it is to be appreciated that embodiments of such dispensing hose 107 may be rounded or be otherwise shaped so as to be capable of dispensing fluid.

The base 101 may comprise a number of wheels 103. In some embodiments, wheels 103 may be removably attached and rotatably coupled to an exterior facing, or lower side, of the base 101. In some embodiments, such as the embodiment shown in FIG. 13, wheels 103 may be removably attached and rotatably coupled to axles protruding from side walls 102 of the base 101. In some embodiments, such axles may be removably coupled to the side walls of the base. Embodiments of the wheels 103 may be a size capable of mobilizing a water storage apparatus 100 through application of human-generated force. As detailed below, in some embodiments, the wheels 103 may be stored within a housing defined by the base 101 and the upper portion 109 when the side walls 102 of the base 101 are placed adjacent to side walls 110 of the upper portion 109. In some embodiments, the wheels 103 may be a size capable of being stored in a housing between the base 101 and the upper portion 109 with the other components of the water storage apparatus 100.

A water storage apparatus 100 may comprise an upper portion 109. Embodiments of an upper portion 109 may comprise side walls 110 and an upper horizontal surface 111. In some embodiments, a hole 112 may be formed in the upper horizontal surface 111. In some embodiments, a cap 118 may be removably placed in the hole 112. In some embodiments, handles 113a, b may be removably attached to the upper portion 109.

In the exemplary embodiment of the handles 113a, b, shown in FIG. 1, the handles 113a, b are attached to an upper horizontal surface 111 of the upper portion 109. One of the exemplary handles 113a is shown having two posts attached to the upper horizontal surface 111 of the upper portion 109.

Another of exemplary handles 113b is shown as having a first post attached to an upper horizontal surface 111 with the handle extending downward to have a second post attached to a column 116 of the chamber 115. It is to be appreciated that embodiments of handles 113a, b may be attached to the water storage apparatus 100 at any number of locations such that the handles 113a, b are capable of aiding human grip and comfort when moving the water storage apparatus 100 by human-applied force. In some embodiments, the handles 113a, b may be stored in a housing between the base 101 and the upper portion 109. In some embodiments, the handles 113a, b may be actuated so to provide carrying capabilities when the water storage apparatus 100 is collapsed and stored in the housing. In some embodiments, the handles 113a, b may be moved to another location on the water storage apparatus 100, or detached and reattached to another location on the water storage apparatus 100 to provide carrying capabilities when the water storage apparatus 100 is collapsed and stored in the housing.

A water storage apparatus 100 may comprise a chamber 115 housing a bladder 117 for storing fluids. The chamber 115 may comprise one or more panels 114 extending from a base 101 to an upper portion 109 and thereby defining the shape of the water storage apparatus 100 and the chamber 115. Embodiments of the chamber 115 may be collapsible or otherwise disassembled. In some embodiments, the panels 114 may be detached from abutting components (e.g., base 101, upper portion 109). In some embodiments, the chamber 115 may comprise columns 116 extending from a base 101 to the upper portion 109 forming corners of the chamber 115, the corners of the columns may have angles based on a number of sides. Embodiments of the columns 116 may be detachably coupled to one or more abutting components (e.g., panels 114, base 101, upper portion 109).

The exemplary embodiment of the water storage apparatus 100 shown in FIG. 1 is a cube having six sides. However, it is to be appreciated that embodiments of the water storage apparatus 100 may comprise any number of sides capable of forming a chamber 115 housing a bladder 117 for fluid storage. In other words, it is to be appreciated that some embodiments of the potable water storage apparatus 100 may be substantially triangular, pyramidal, pentagonal, octagonal, or any other shape. It is to be appreciated that some embodiments of the water storage apparatus 100 may be substantially cylindrical in shape. It is also to be appreciated that the components of the water storage apparatus 100 described herein (i.e., a base 101, an upper portion 109, a chamber 115) may comprise a number of sides dependent upon the shape of the embodiment of the water storage apparatus 100. Thus, it is to be understood that the term "sides" used to describe embodiments of the water storage apparatus 100 is not intended to limit the shape of the water storage apparatus 100, base 101, upper portion 109, or chamber 115. For example, in embodiments forming a substantially cylindrical shape, the base 101 and the upper portion 109 may each form a circular shape. The chamber 115 may comprise one or more panels 114 extending from the base 101 to the upper portion 109 forming a substantially tubular shape.

Figure 2A:
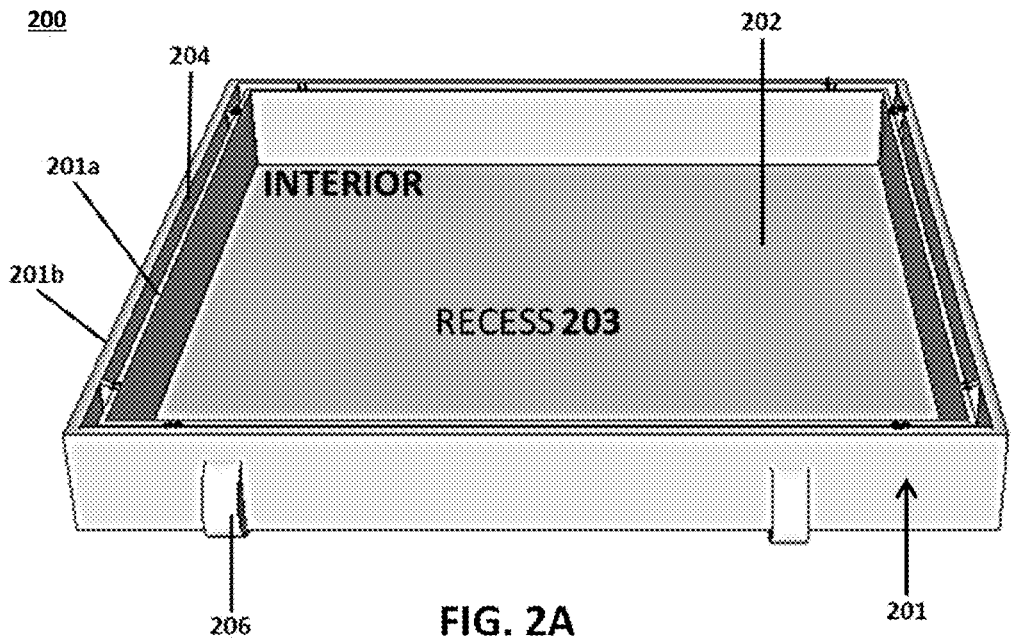
FIG. 2A shows an interior perspective view from a back side of an exemplary embodiment of a base for a water storage apparatus.
Figure 2B:
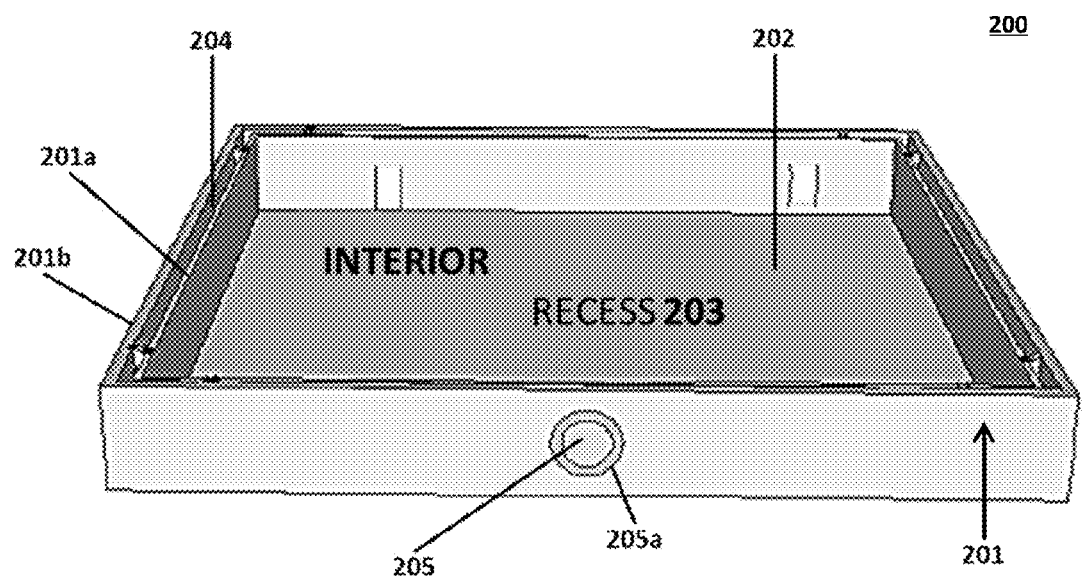
FIG. 2B shows an interior perspective view from a front side of an exemplary embodiment of a base for a water storage apparatus

FIG. 2A shows an interior perspective view from a back side of an exemplary embodiment of a base 200 for a water storage apparatus. FIG. 2B shows an interior perspective from a front side of an exemplary embodiment of a base 200 for a water storage apparatus. A base 200 may comprise side walls 201 and a lower horizontal surface 202, together defining a recess 203 on the interior of the base 200.

The base 200 may comprise a lower horizontal surface 202 having an interior side, or upper side, facing a chamber of the water storage apparatus, and an exterior side, or lower side, facing away from the chamber. The base 200 may comprise side walls 201. The number of side walls may be based on a number of sides of an embodiment of the water storage apparatus. The side walls 201 of the base 200 may protrude upwards towards a chamber of the water storage apparatus. The lower horizontal surface 202 and the protrusion of the sides walls 201 away from the lower horizontal surface 202, may define a recess 203 of the base 200. In some embodiments, side walls 201 may comprise grooves 204 defined by an inner side wall 201a and an outer side wall 201b. These grooves 204 may receive an end of a panel or column of the chamber, and the side walls may protrude upwards an amount needed for supporting and controlling components defining the chamber.

In some embodiments of the base 200, as shown in FIG. 2A, bumpers 206 may be attached to a side wall on the back of the base 200.

In some embodiments of the base 200, as shown in FIG. 2B, a hole 205 may be formed in a side wall 201 on the front side of the base 200. In some embodiments, the hole 205 is may be airtight preventing fluids from escaping. In some embodiments, a bladder for storing fluids and resting in the recess 203 may comprise an orifice removably coupled to the hole 205 at an interior side of the side wall 201. In some embodiments, a water dispenser (e.g., hose, spigot) may be attached to the hole 205 on an exterior side of the side wall 201. In some embodiments, an outer ring 205a comprising a grommet, threaded ring, or other means for removably coupling the water dispenser may circumscribe the hole 205. That is, embodiments of an outer ring 205a may provide a means for attaching, screwing, or otherwise removably coupling the water dispenser to the hole 205.

Figure 3:
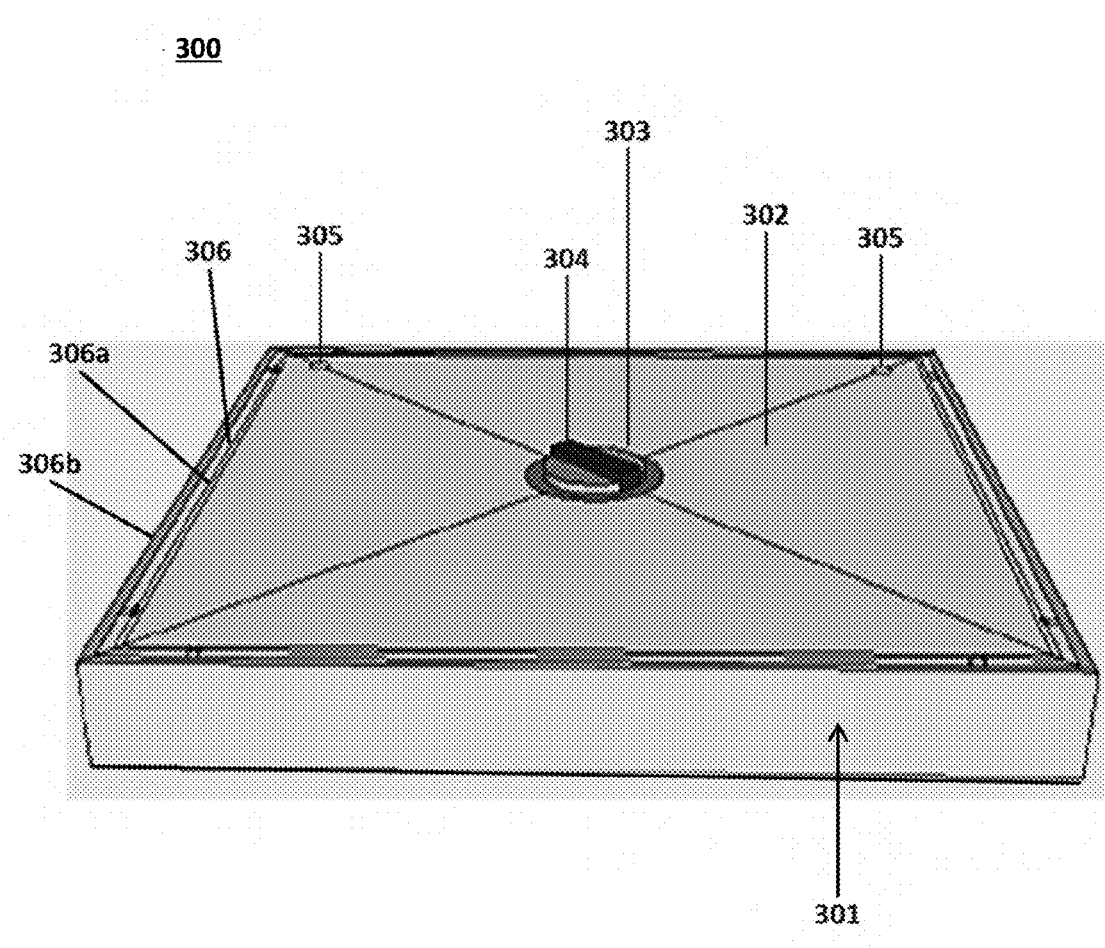
FIG. 3 shows an exterior perspective view of an exemplary embodiment of an upper portion for a water storage apparatus.

FIG. 3 shows an exterior perspective view of an exemplary embodiment of an upper portion 300 for a water storage apparatus. The exemplary embodiment of the upper portion 300 comprising side walls 301 and an upper horizontal surface 302 defining a recess (not shown) in the upper portion 300.

Embodiments of an upper portion 300 may comprise an upper horizontal surface 302 having an interior side, or lower side, facing a chamber of the water storage apparatus, and an exterior side, or upper side, facing away from the chamber. In some embodiments, the upper horizontal surface 302 may comprise a filling hole 303 that extends through the upper portion 300 to a bladder storing fluids on the interior side of the upper portion 300. In some embodiments, the bladder may comprise an orifice that may be removably attached to the hole on an interior side of the upper portion 300 for receiving fluids to fill the bladder and/or for dispensing the contents of the bladder. In some embodiments, a cap 304 may seal the filling hole 303 formed in the upper horizontal surface 302. The cap 304 may prevent loss of the contents of the bladder and may also prevent contamination of the contents of the bladder. As detailed later, in some embodiments, a filling hose, pipe, funnel, or other means for delivering fluids may be attached to an exterior side of the filling hole 303 and may deliver fluids to an orifice of a bladder attached at the interior side of the upper portion 300.

In some embodiments, an upper horizontal surface 302 may comprise a means for attaching handles to the upper horizontal surface 302, for example, holes 305 for receiving posts of handles. However, other means for attaching handles to the water storage apparatus may be utilized.

Embodiments of an upper portion 300 may comprise a number of side walls 301 protruding downward, toward the interior of a water storage apparatus. The side walls 301 and the upper horizontal surface 302 may form a recess (not shown) on the interior side of the upper portion 300. In some embodiments, the side walls 301 may comprise grooves 306 defined by an interior side wall 306a and an exterior side wall 306b. The grooves 306 may receive an end of a panel or column of a chamber, and the side walls may protrude downwards an amount needed for supporting and controlling the components defining the chamber.

Figure 4:
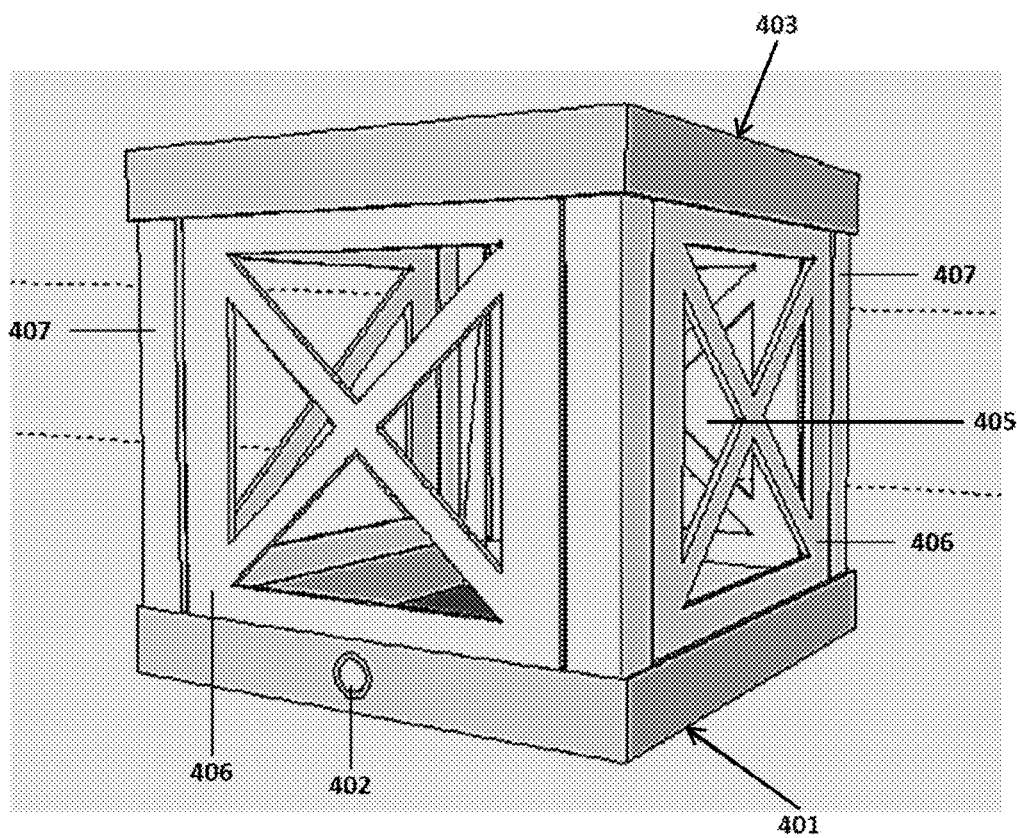
FIG. 4 shows components defining a chamber of an exemplary embodiment of a water storage apparatus.

FIG. 4 shows components defining a chamber 405 of an exemplary embodiment of a water storage apparatus 400 having a chamber 405 defined by a base 401, an upper portion 403, panels 406 and columns 407.

The water storage apparatus 400 may comprise a chamber 405 partitioning an interior space from an exterior space. The chamber 405 may be formed by the erection of the components of the water storage apparatus 400. In some embodiments, a first end of side panels 406 and columns 407 may be inserted into grooves formed in a base 401. In some embodiments, a flexible fluid bladder (not shown) may be placed in the interior space of the chamber 405 and an orifice of the bladder may be removably coupled to a hole 402 in the base 401 at the interior side of the hole 402. The side panels 406 and columns 407 may provide a structure for containing a flexible fluid bladder while the bladder is being filled. In some embodiments, a second end of each of the side panels 406 and columns 407 may be inserted into grooves in an upper portion 403. In some embodiments, once the orifice of the bladder is coupled to a filling hole (not shown) of the upper horizontal surface, the upper portion 403 may be adjoined to the side panels 406 and columns 407 of the chamber 405, fitting the side panels 406 and columns 407 into the grooves of the upper portion 403, thereby forming the chamber 405.

In some embodiments, the chamber 405 of the water storage apparatus 400 may be secured together by bungees (not shown) clipped to the upper portion 403 and base 401, with a bungee wrapping around the chamber 405. In some embodiments, clips, snaps, screws, or bolts may be used for securing joints of the water storage apparatus 400.

It is to be appreciated that the exemplary embodiment of the water storage apparatus 400 is shown having skeletal side panels 406 to exemplify the various features of the water storage apparatus 400. Some embodiments may comprise components having a different skeletal pattern. Some embodiments may comprise components that are entirely solid. Some embodiments may comprise chemical compositions rendering the components clear and see through. Some embodiments may comprise chemical compositions rendering the components solid and unable to be seen through.

Figure 5:
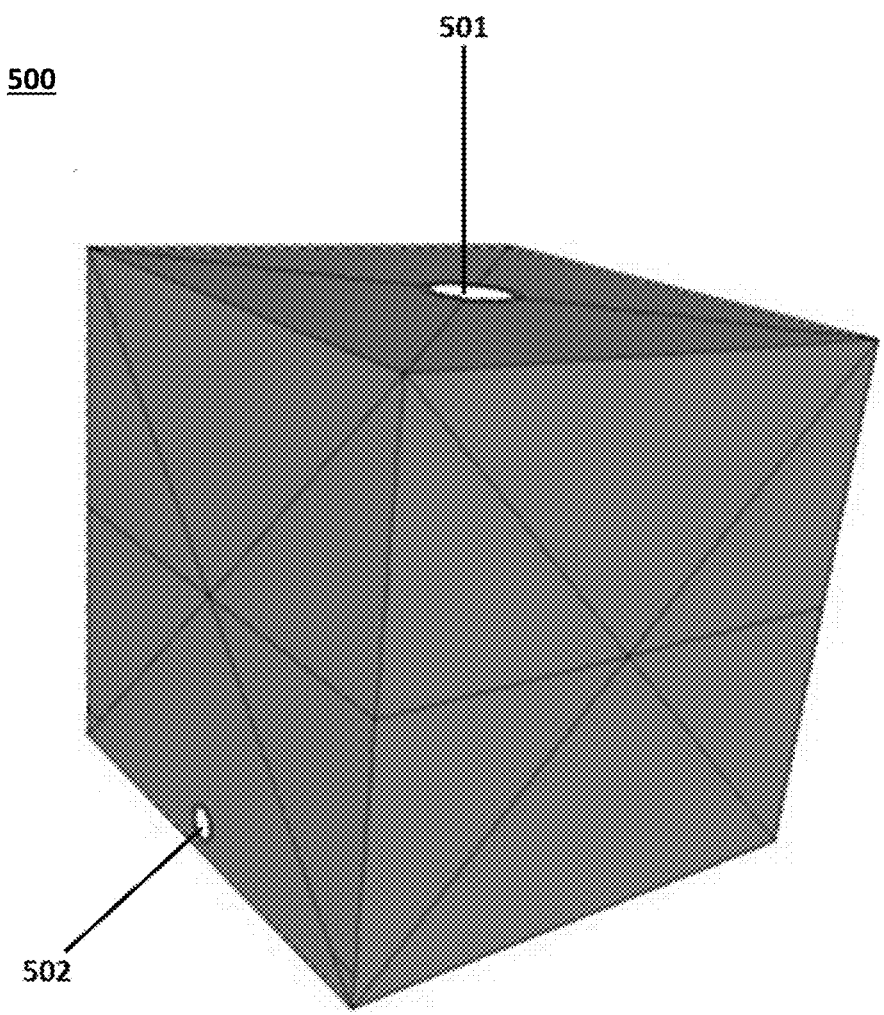
FIG. 5 shows an exemplary embodiment of a flexible bladder for a water storage apparatus.

FIG. 5 shows an exemplary embodiment of a flexible bladder 500 for a water storage apparatus comprising a first orifice 501 and a second orifice 502.

The flexible bladder 500 may comprise one or more orifices 501, 502 for filling the bladder 500 with fluids and/or extracting fluids from the bladder 500. In some embodiments, a first orifice 501 may correspond with a hole in a chamber containing the bladder 500. In some embodiments, the first orifice 501 may be detachably coupled to the corresponding hole in the chamber. In some embodiments, the first orifice 501 may be located near a top of the bladder 500 and correspond to a hole in an upper portion of the chamber.

Some embodiments of a bladder 500 may comprise a second orifice 502 for filling the bladder 500 with fluids and/or extracting fluids from the bladder 500. In some embodiments, the second orifice 502 may correspond to a hole in a chamber containing the bladder 500. In some embodiments, the second orifice 502 of the bladder 500 may be detachably coupled to the corresponding hole in the chamber. In some embodiments, the second orifice 502 may be located near a bottom of the bladder 500 and correspond to a hole in a base of the chamber.

It is to be appreciated that the exemplary embodiment of FIG. 5 shows the flexible bladder 500 as a cube merely to display the flexibility of the bladder 500, i.e., embodiments of a bladder 500, when substantially filled with a fluid, may appear to take the shape of the containing chamber. The bladder 500 in FIG. 5 is shown as being substantially cubed in shape due to the exemplary embodiment shown in the figures. However, it is to be appreciated that embodiments of the bladder 500 are not limited to the shapes shown in the exemplary embodiment of FIG. 5 or any other exemplary embodiment described herein. It is to be appreciated that embodiments of the bladder 500 may have no pre-defined shape, embodiments of the bladder 500 may have any pre-defined shape, and/or embodiments of the bladder 500 may have a fluidly changing shape.

Figure 6:
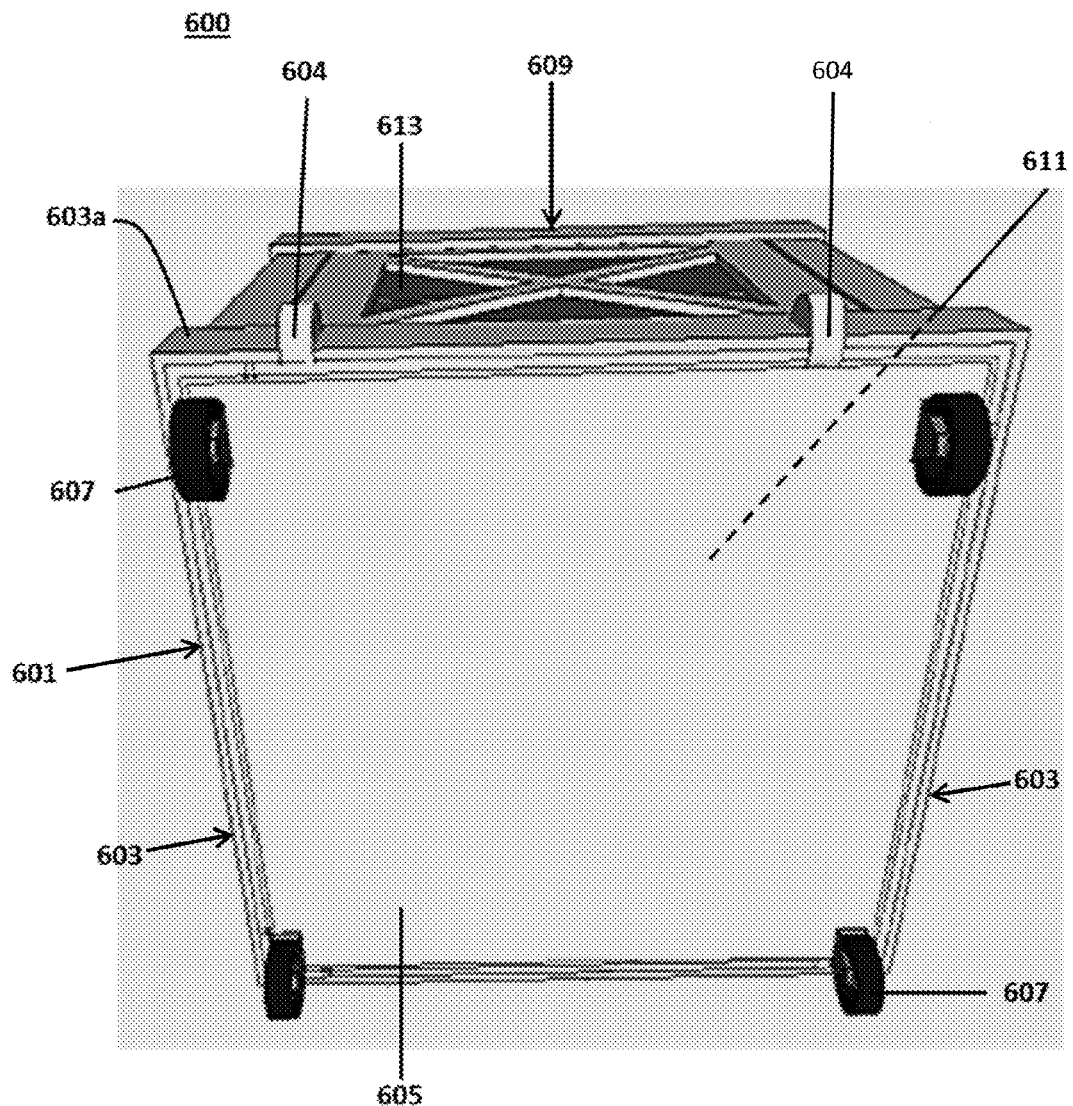
FIG. 6 shows a perspective view of an exemplary embodiment of a water storage apparatus.

FIG. 6 shows a perspective view of an exemplary embodiment of a water storage apparatus 600 from an exterior bottom-side underneath a base 601. The water storage apparatus 600 has a base 601, a chamber 611 housing a bladder 613, and an upper portion 609. The base 601 has side walls 603 and a lower horizontal surface 605.

As earlier described, a base 601 may comprise side walls 603 protruding upwards toward an upper portion 609. In some embodiments, a rear side wall 603a may comprise bumpers 604 or some other useful attachments. A base 601 may comprise a lower horizontal surface 605 having a face on an interior side, or upper side, and a face on an exterior side, or lower side. In some embodiments, an exterior side of the lower horizontal surface 605 may comprise a means for attaching wheels 607 to the base 601. In some embodiments, the lower horizontal surface 605 may comprise holes (not shown) for receiving posts attached to wheels 607. In other embodiments, however other means for removably attaching rotatable wheels 607 are possible.

It is to be appreciated that any number of rotatably coupled wheels 607 may be attached to the water storage apparatus 600 at locations other than the base 601 or the lower horizontal surface 605. It is to be appreciated that the wheels 607 may be of any size.

Figure 7:
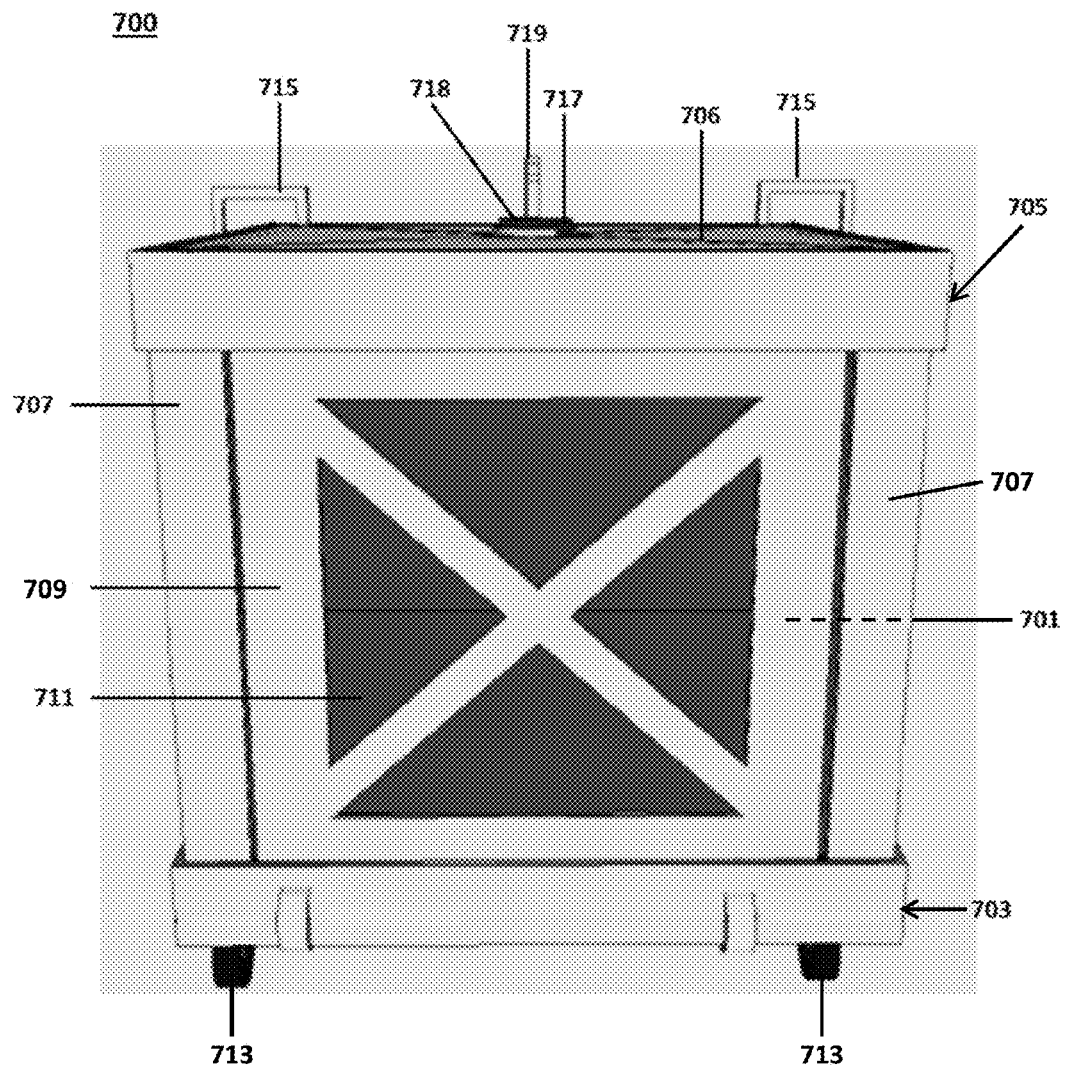
FIG. 7 shows a rear view of an assembled exemplary embodiment of a water storage apparatus.

FIG. 7 shows a rear view of an assembled exemplary embodiment of a water storage apparatus 700 comprising a chamber 701 housing a bladder 711, a base 703, and an upper portion 705.

As shown in the exemplary embodiment of FIG. 7, a chamber 701 may be defined by a base 703 on a lower end of the water storage apparatus 700 and an upper portion 705 on an upper end of the water storage apparatus 700. In some embodiments, sides of the chamber 701 may be defined by side panels 709 and columns 707 extending from the base 703 to the upper portion 705.

An upper portion 705 may comprise an upper horizontal surface 706 having an interior facing side, or lower side, and an exterior facing side, or upper side. In some embodiments, the upper portion 705 may comprise a filling hole 717 for accessing an orifice of a bladder 711 housed within the chamber 701. The filling hole may be sealed with a cap 718 on the exterior side of the upper horizontal surface 706. In some embodiments, the upper portion may comprise handles 715. In some embodiments, the exterior side of the upper horizontal surface 706 may comprise holes or other means for attaching the handles 715. Some embodiments of a water storage apparatus 700, may comprise a base 703 having rotatable wheels 713 detachably coupled to the base 713. In some embodiments, a hose 719 may be detachably coupled to the water storage apparatus 700 for dispensing fluid from the bladder 711.

Figure 8:
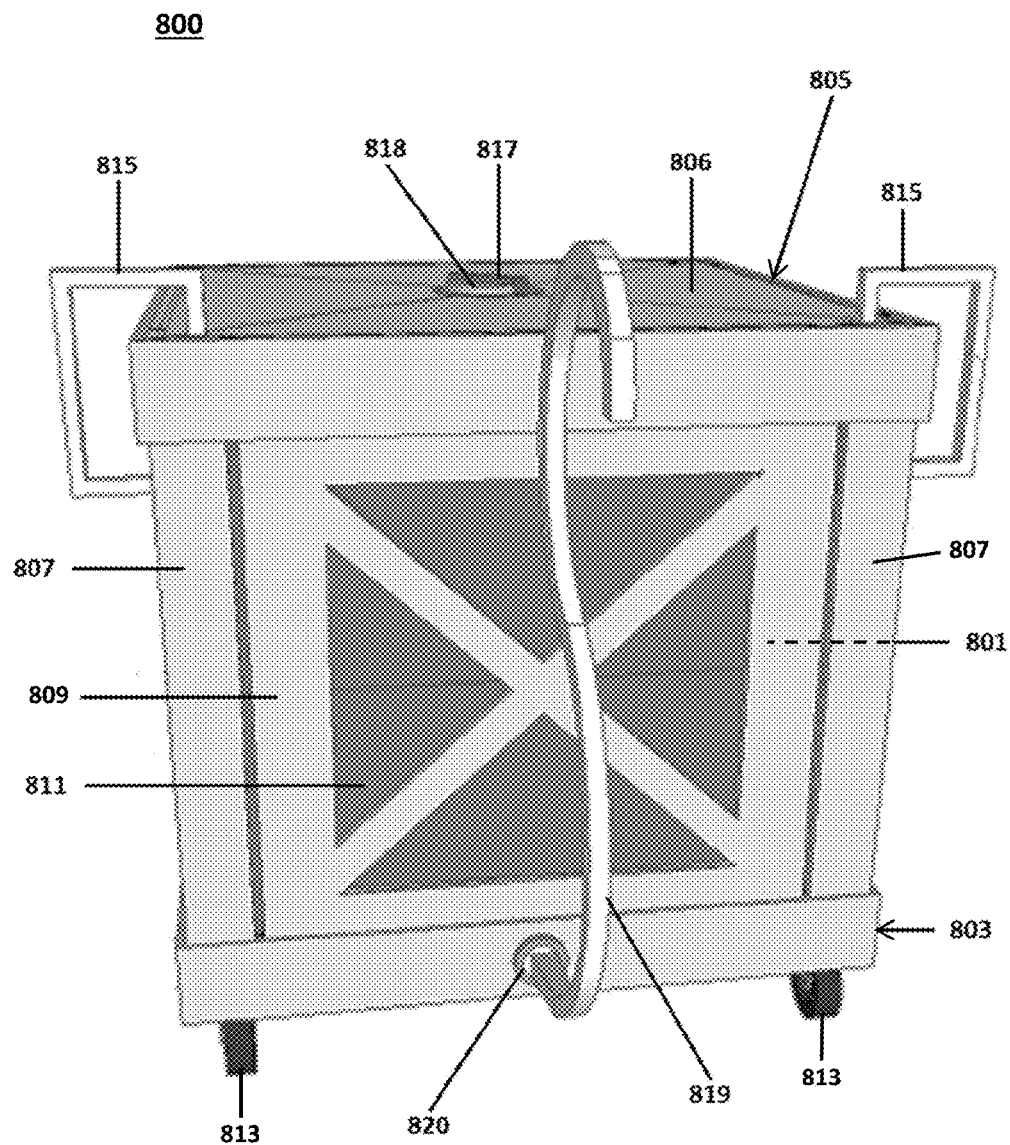
FIG. 8 shows a front perspective view of an assembled exemplary embodiment of a water storage apparatus.

FIG. 8 shows a front perspective view of an assembled exemplary embodiment of a water storage apparatus 800 comprising a chamber 801 housing a bladder 811, a base 803, and an upper portion 805.

As shown in the exemplary embodiment of FIG. 8, a chamber 801 may be defined by a base 803 on a lower end of the water storage apparatus 800 and an upper portion 805 on an upper end of the water storage apparatus 800. In some embodiments, sides of the chamber 801 may be defined by side panels 809 and columns 807 extending from the base 803 to the upper portion 805.

An upper portion 805 may comprise an upper horizontal surface 806 having an interior facing side, or lower side, and an exterior facing side, or upper side. In some embodiments, the upper portion 805 may comprise a filling hole 817 for accessing an orifice of a bladder 811 housed within the chamber 801. The filling hole may be sealed with a cap 818 on the exterior side of the upper horizontal surface 806. In some embodiments, the upper portion may comprise handles 815. In some embodiments, the exterior side of the upper horizontal surface 806 may comprise holes or other means of attaching the handles 815. Some embodiments of a water storage apparatus 800, may comprise a base 803 having wheels 813 detachably connected to the base 803. In some embodiments, a hose 819 may attach to a base 803 at a hole 820 formed into the base 803 for dispensing fluid from the bladder 811.

Figure 9:
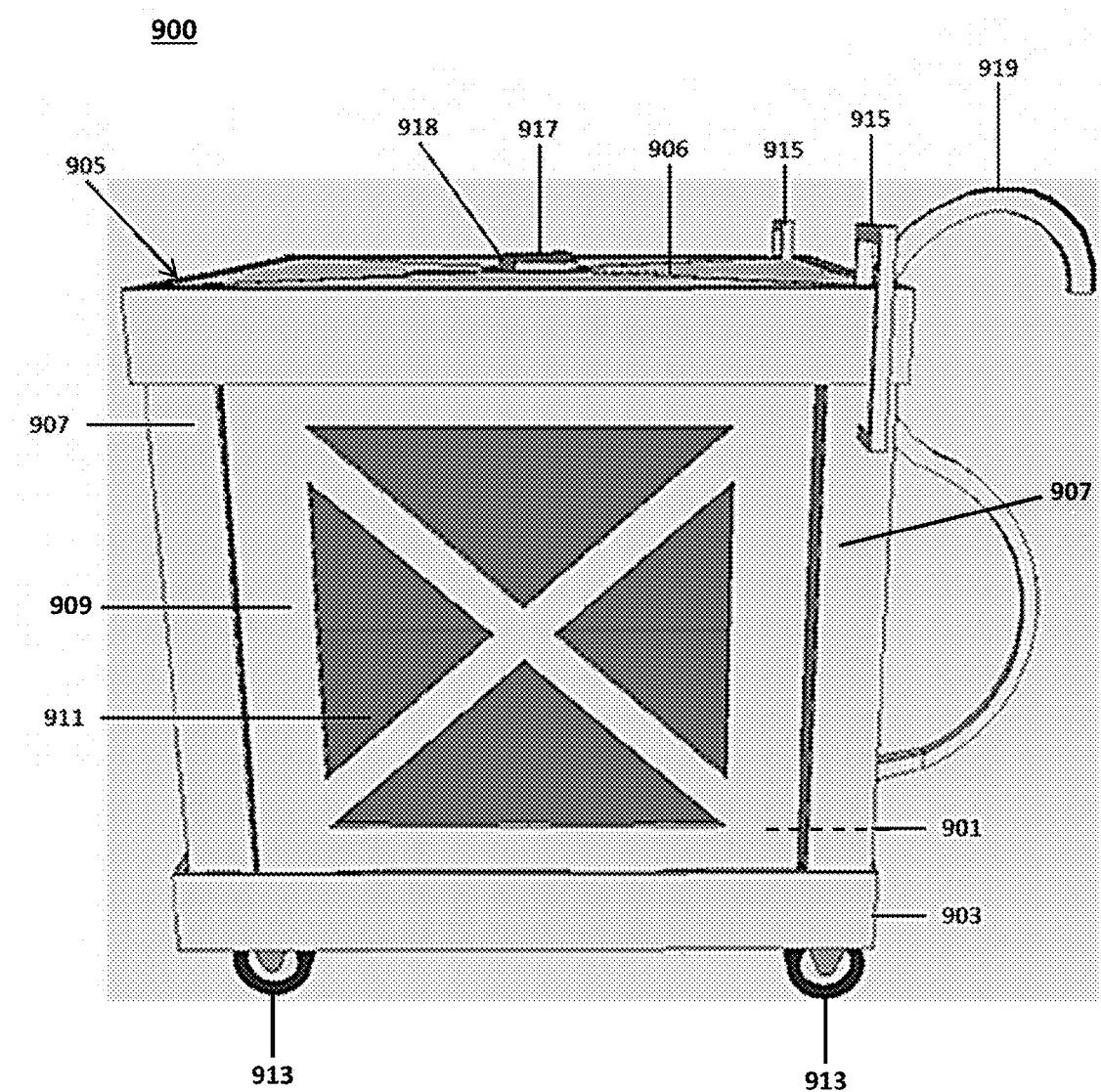
FIG. 9 shows a side view of an assembled exemplary embodiment of a water storage apparatus.

FIG. 9 shows a side view of an assembled exemplary embodiment of a water storage apparatus 900 comprising a chamber 901 housing a bladder 911, a base 903, and an upper portion 905.

As shown in the exemplary embodiment of FIG. 9, a chamber 901 may be defined by a base 903 on a lower end of the water storage apparatus 900 and an upper portion 905 on an upper end of the water storage apparatus 900. In some embodiments, sides of the chamber 901 may be defined by side panels 909 and columns 907 extending from the base 903 to the upper portion 905.

An upper portion 905 may comprise an upper horizontal surface 906 having an interior facing side, or lower side, and an exterior facing side, or upper side. In some embodiments, the upper portion 905 may comprise a filling hole 917 for accessing an orifice of a bladder 911 housed within the chamber 901. The filling hole may be sealed with a cap 918 on the exterior side of the upper horizontal surface 906. In some embodiments, such as that of FIG. 9, the upper portion may comprise detachable handles 915 extending from the upper portion 905 to columns 907. The handles 915 comprise a first post removably attached to the upper portion 905 and second post removably attached to the column 915. In some embodiments, the exterior side of the upper horizontal surface 906 may comprise holes or other means of attaching the handles 915.

Some embodiments of a water storage apparatus 900, may comprise a base 903 having wheels 913 detachably connected to the base 903. In some embodiments, a hose 919 may attach at the base 903 of the water storage apparatus 900 and may dispense fluid from the bladder 911.

Figure 10:
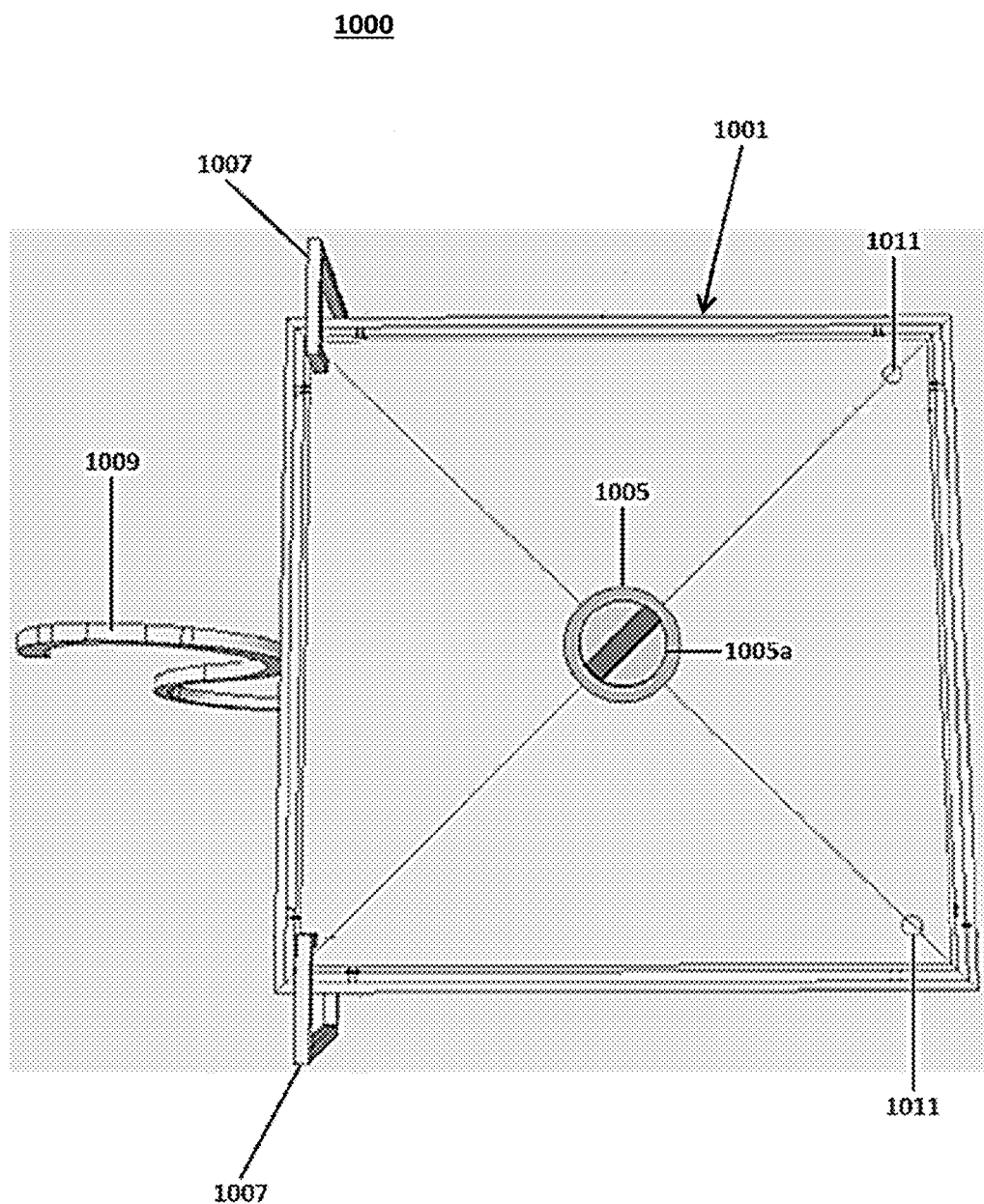
FIG. 10 shows a top view of an assembled embodiment of a water storage apparatus.

FIG. 10 shows a top view of an assembled embodiment of a water storage apparatus 1000 comprising an upper portion 1001 having detachable handles 1007, and a hose 1009.

In some embodiments of a water storage apparatus, such as the exemplary embodiment shown in FIG. 10, may comprise an upper portion 1001 having a filling hole 1005 for accessing an orifice of a bladder housed within the water storage apparatus. In some embodiments, the filling hole 1005 may be sealed by a removable cap 1005a. In some embodiments, handles 1007 may be attached to the upper portion 1001 via handle holes 1011 in the upper portion 1001.

Figure 11:
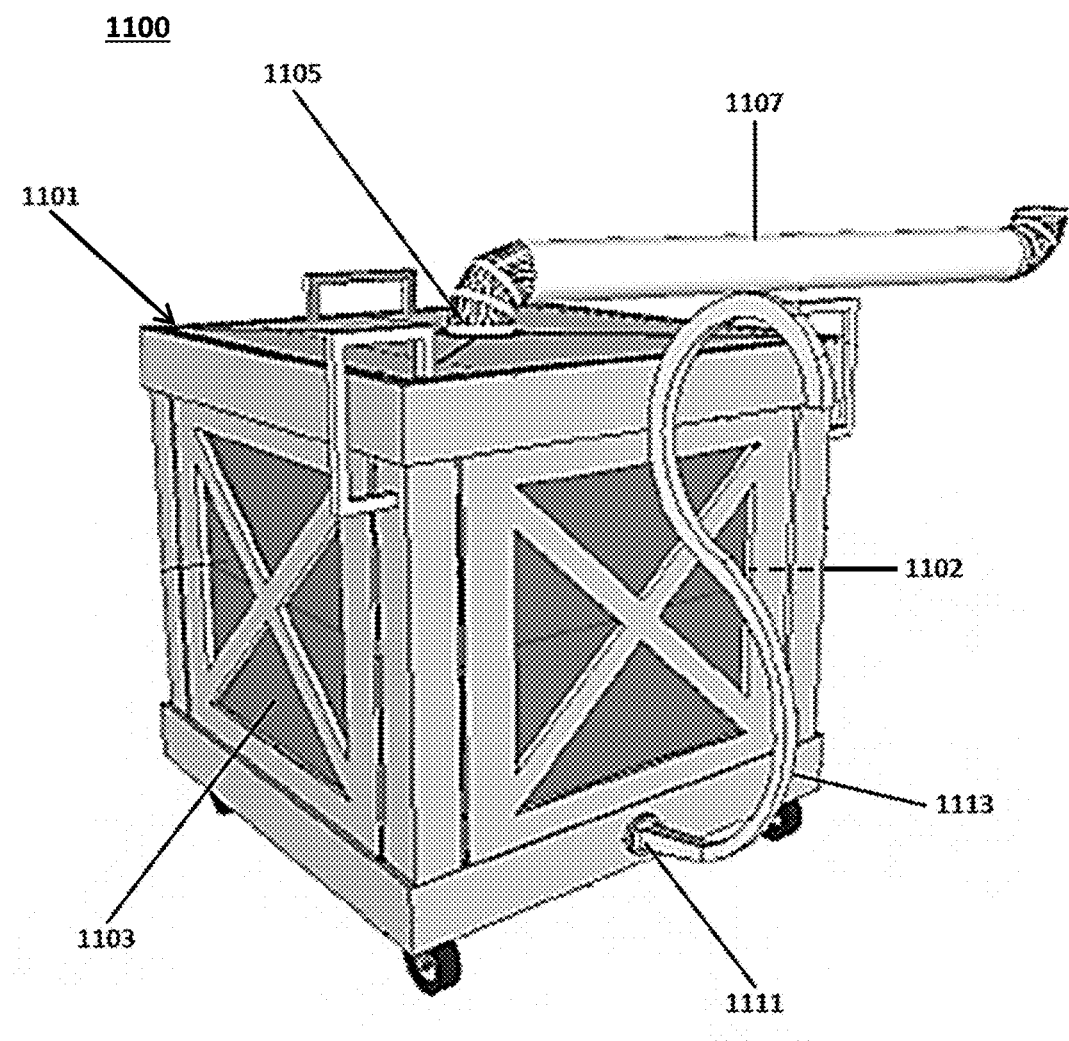
FIG. 11 shows a perspective front view of an assembled exemplary embodiment of a water storage apparatus.

FIG. 11 shows a perspective front view of an assembled exemplary embodiment of a water storage apparatus 1100 in which a bladder 1103 is being filled with a fluid. The exemplary embodiment of the water storage apparatus 1100 comprising an upper portion 1101, and a chamber 1102 housing a bladder 1103.

In the exemplary embodiment of FIG. 11, a chamber 1102 may contain a bladder 1103 being filled with a fluid through an orifice of the bladder using a delivery hose 1107. An upper portion 1101 may comprise a filling hole 1105 that may receive a delivery hose 1107 or other means for delivering a fluid, such as a pipe or a funnel. In some embodiments, the delivery hose 1107 may be detachably coupled to the filling hole 1105. In some embodiments, the bladder 1103 may comprise an orifice (not shown) corresponding to the filling hole 1105 of the upper portion 1101. In some embodiments, the corresponding orifice of the bladder 1103 may be detachably coupled to an interior side of the filling hole 1105 of the upper portion 1101.

A water storage apparatus 1100 may comprise a dispensing hole 1111. In some embodiments, a fluid dispenser, such as a hose 1113 or a spigot, may be detachably connected to the dispensing hole 1111 of the water storage apparatus 1100. In some embodiments, a bladder 1103 may comprise an orifice (not shown) corresponding to the dispensing hole 1111. That is, in such embodiments, the corresponding orifice of the bladder 1103 may be detachably coupled to an interior side of the dispensing hole 1111 of the base.

Figure 12:
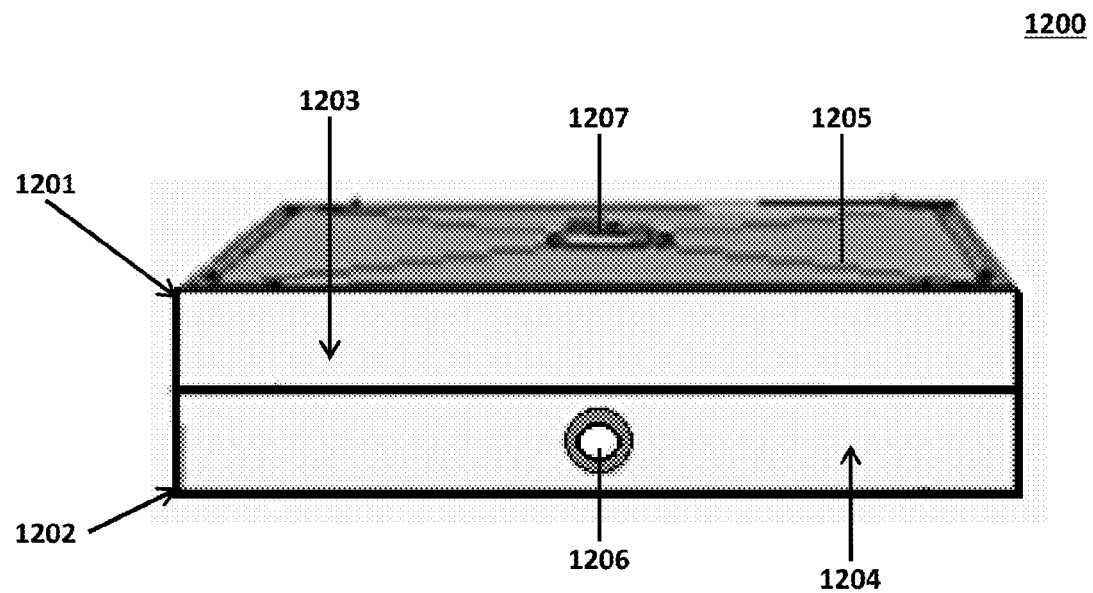
FIG. 12 shows an exemplary embodiment of a water storage apparatus in a disassembled configuration.

FIG. 12 shows an exemplary embodiment of a water storage apparatus in a disassembled configuration 1200. That is, some embodiments of the water storage apparatus disclosed herein may be capable of various configurations. Some embodiments of the water storage apparatus may comprise components capable of collapsing or otherwise disassembling. In some embodiments, some components, once collapsed or disassembled, may be capable of storing other components, which may also be collapsed or disassembled. As shown by FIG. 12, one exemplary embodiment of a water storage apparatus shown in a disassembled or collapsed configuration 1200 may comprise an upper portion 1201 and a base 1202.

In some embodiments, a upper portion 1201 may comprise a filling hole 1207 for filling a bladder at times when the water storage apparatus 1200 is in an assembled configuration. In some embodiments, the filling hole 1207 may be formed into an upper horizontal surface 1205 of the upper portion 1201.

In some embodiments, a base 1202 may comprise a hole 1206 formed into a side wall 1204. In some embodiments, the hole 1206 may be for dispensing water, or other liquid, that may be stored in a bladder when the water storage apparatus 1200 is in an assembled configuration.

In some embodiments, side walls 1204 of a base 1202 may protrude towards an upper portion 1201. The upper portion 1201 may comprise side walls 1203 that may protrude towards the base 1202, thereby forming a housing from the exemplary configuration of the disassembled water storage water storage apparatus 1200. That is, the housing formed from the disassembled configuration of the water storage apparatus 1200 may be formed by placing the side walls 1204 of the base 1202 substantially adjacent to the side walls 1203 of the upper portion 1201. In some embodiments, various components of the water storage apparatus in the disassembled configuration 1200 (e.g., panels, wheels, bladder) may be stored within the housing.

Figure 13:
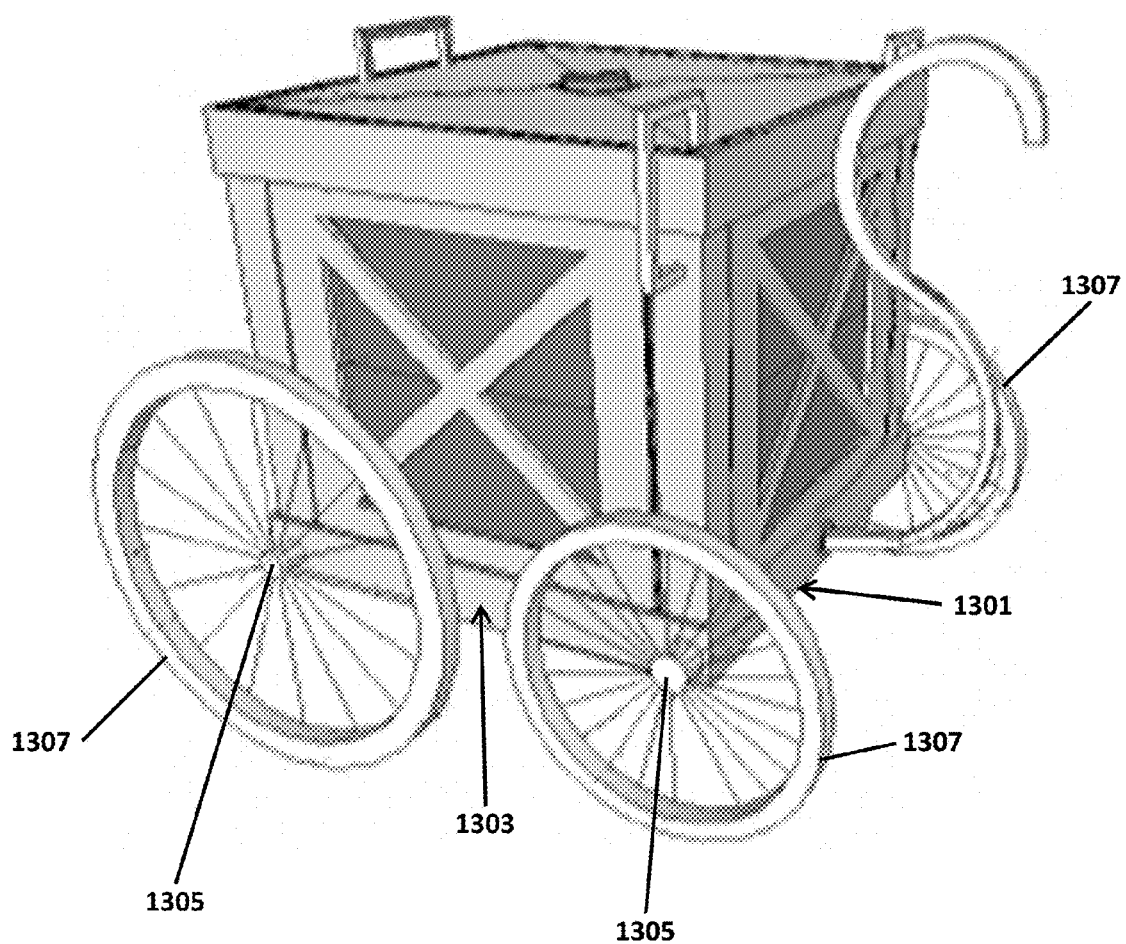
FIG. 13 shows an exemplary embodiment of a water storage apparatus having an alternative configuration comprising wheels protruding from side walls of a base.

FIG. 13 shows an exemplary embodiment of a water storage apparatus 1300 comprising wheels 1307 protruding from side walls 1303 of a base 1301.

In some embodiments, removable axles 1305 may protrude from the side walls 1301 of the base 1301. In such embodiments, removable wheels 1307 may be rotatably coupled to the axles 1305 on either side of the water storage apparatus 1300. In some embodiments, the removable wheels 1307 may be rotatably coupled to axles 1305 that may attach to the base 1301 underneath the water storage apparatus 1300 at a lower horizontal surface of the base 1301.

In one example, the removable wheels 1307 may be wireframe wheels, such as bicycle wheels, and these wheels 1307 may be rotatably coupled to the axles 1305. In some embodiments, wheels 1307 on one end of the water storage apparatus 1300 may be larger than wheels on another end of the water storage apparatus 1300.

Figure 14:
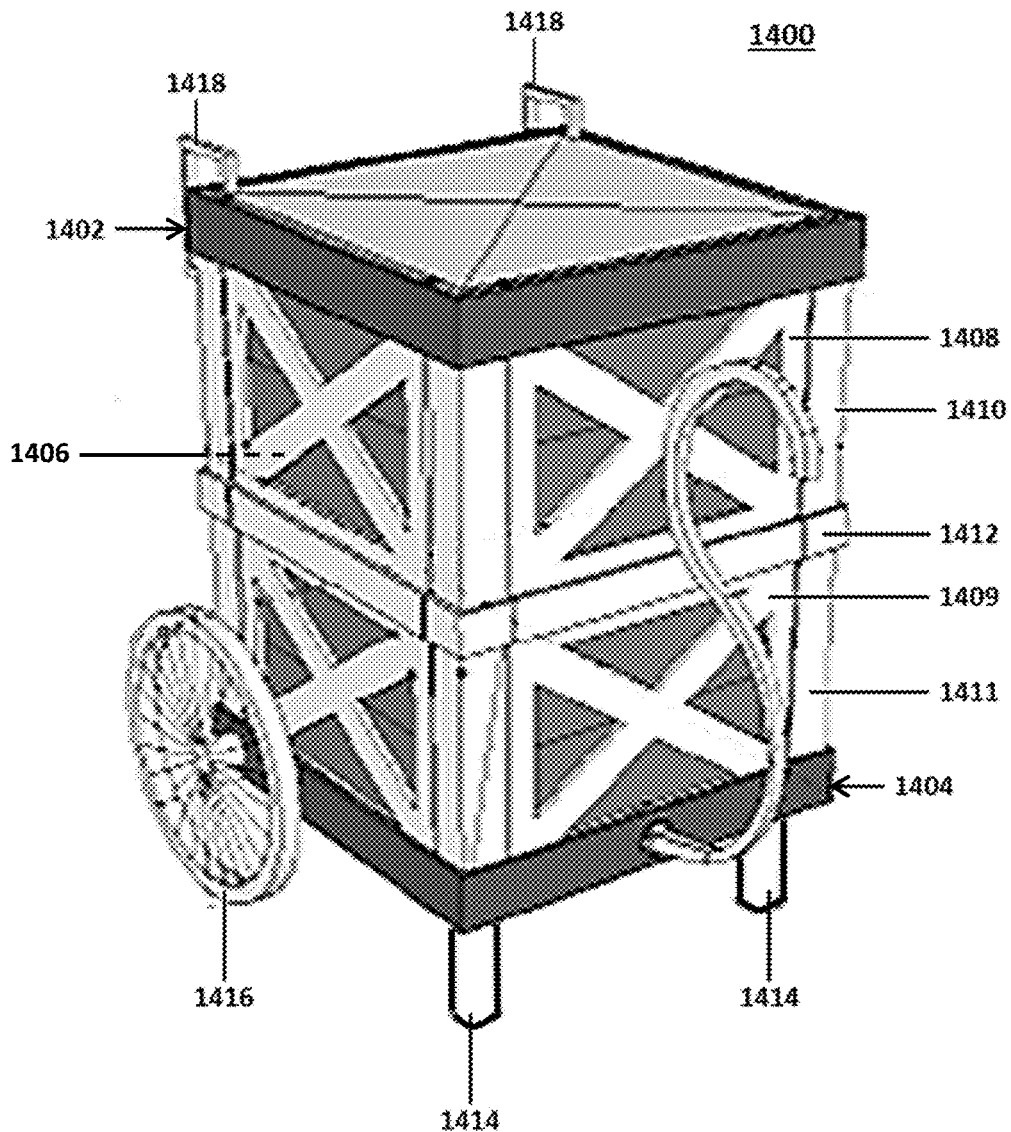
FIG. 14 shows an exemplary embodiment of the a water storage apparatus having an alternative configuration.

FIG. 14 shows an exemplary embodiment of a water storage apparatus 1400 comprising an upper portion 1402, a base 1404, and a chamber 1406 situated between the upper portion 1402 and the base 1404. In the exemplary embodiment of FIG. 14, the chamber 1406 comprises side panels 1408, 1409 and columns 1410, 1411 partitioned by a middle portion 1412 into upper panels 1408, upper columns 1410, lower panels 1409, and lower columns 1411.

In some embodiments, components of a chamber 1406 may be partitioned by middle portion 1412. The middle portion 1412 may be a coupling joint allowing adjoining panels 1408, 1409 and columns 1410, 1411 to be coupled together, thereby forming the chamber 1406. In some embodiments, the middle portion 1412 may be defined by a bevel at the top of lower components 1409, 1411 to which upper components 1408, 1410 may be fastened. In some embodiments, the middle portion 1412 may be defined by a bevel at the bottom of upper components 1408, 1410. to which lower components 1409, 1411 may be fastened.

In some embodiments, the middle portion 1412 may be a solid partition partitioning the chamber 1406, and allowing components 1408, 1409, 1410, 1411 to be fastened together and/or to the middle portion 1412. In such embodiments, the water storage apparatus 1400 may comprise bladders within each partition of the chamber 1406.

In some embodiments, the upper portion 1402 may comprise handles facilitating human locomotion of the water storage apparatus 1400. In some embodiments, wheels 1416 may be place on the sides of the water storage apparatus 1400 by axles protruding from the sides of the base 1404 allowing for wheels 1416 to be rotatably attached to the axles. Additionally or alternatively, in some embodiments, pegs 1414 may be removably attached to the base 1404.

In some embodiments, such as the embodiment shown in FIG. 14, the base 1404 may comprise wheels 1416 and pegs 1414 on opposing ends of the base 1404. The wheels 1406 may be positioned underneath handles 1418 attached to an upper 1418 such that weight of the water storage apparatus 1400 may be tilted on the axles of the base 1404 toward a human operator or other means of moving the water storage apparatus 1400. When the water storage apparatus 1400 is relocated using the wheels 1416, the weight may be shifted by the axles onto the pegs 1414 of the base 1404.

In some embodiments, the water storage apparatus 1400 may be disassembled in various ways for storage. In some embodiments, the components 1408, 1409, 1410, 1411 may be stored within a housing, as described earlier. In some embodiments, such as the exemplary embodiment shown in FIG. 15, the side panels 1408, 1409 may be stacked onto one another and then the stack of side panels 1408, 1409 may be placed in between the side walls of the base 1404 and the upper portion 1402.

Figure 15:
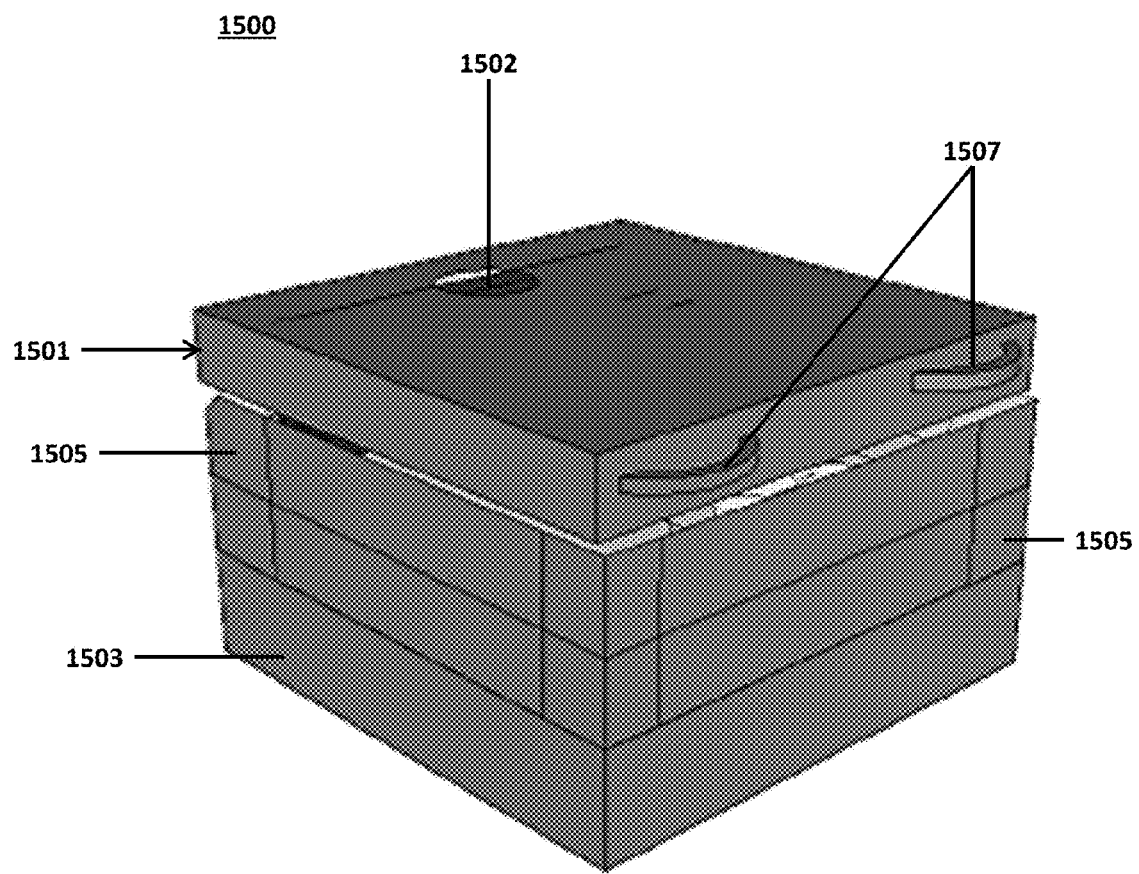
FIG. 15 shows an exemplary embodiment of a water storage apparatus in a disassembled configuration.

FIG. 15 shows an exemplary embodiment of a water storage apparatus in a disassembled configuration 1500 ready for storage. The exemplary embodiment of the disassembled or collapsed water storage apparatus 1500 may comprise an upper portion 1501 having a filling hole 1502, a base 1503, and a stack of side panels 1505.

In some embodiments, the side walls of a base 1503 may be abutted to side walls of an upper portion 1501 such that a housing is formed by a recess of the base facing the recess of the upper portion 1501 for storing various components of the water storage apparatus 1500. In some embodiments, components of the water storage apparatus 1500 may fit within the storage housing formed by the base 1503 and the upper portion 1501. In some embodiments, as in the exemplary embodiment of FIG. 15, side panels 1505 forming the collapsed chamber may be stacked on one another. In such embodiments, other components of the water storage apparatus 1500 may fit within a storage housing that may be formed by the base 1503, upper portion 1501, and the stackable side panels 1505, such that the side walls of the base 1503 are adjacent to one end of the stack of side panels 1505 and the side walls of the upper portion 1501 are adjacent to the opposing end of the stack of side panels 1505.

In some embodiments, detachable handles 1507 may be stored within the storage housing. In some embodiments, as in FIG. 15, detachable handles 1507 may be attached to various areas of the storage housing to allow for easier mobility of the water storage apparatus 1500 having a different shape or construction when disassembled.

The exemplary embodiments described herein relate to an apparatus capable of storing and conveying water. However, it should be appreciated that embodiments of the invention are not intended to be limited to water. It is to be appreciated that embodiments of the invention may store and/or dispense any fluids. The exemplary embodiments can relate to an apparatus for performing one or more of the functions described herein. Skilled artisans may implement the described method and apparatus in varying ways for a particular use, but such implementation decisions should not be interpreted as causing a departure from the scope of the present invention. While various aspects and embodiments have been disclosed, other aspects and embodiments are contemplated. The various aspects and embodiments disclosed are for purposes of illustration and are not intended to be limiting, with the true scope and spirit being indicated by the following claims. The preceding description of the disclosed embodiments is provided to enable any person skilled in the art to make or use the present invention. Various modifications to these embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the following claims and the principles and novel features disclosed herein.

What is claimed is:

1. A water storage apparatus comprising:
a base comprising a lower horizontal surface, one or more wheels attached to the base, a plurality of walls extending upwardly from edges of the lower horizontal surface, thereby forming a recess in the base defined by the walls and the lower horizontal surface, wherein at least one of the plurality of walls has a hole configured to be detachably coupled to a fluid dispenser;
an upper portion comprising an upper horizontal surface having a plurality of walls extending downwardly from edges of the upper horizontal surface, thereby forming a recess in the upper portion defined by the walls of the upper portion and the upper horizontal surface, wherein the upper horizontal surface comprises a hole;
a plurality of removable panels extending from the base to the upper portion forming a chamber defined by the plurality of removable panels, the base, and the upper portion, wherein the removable panels are separable from one another, and are configured to fit in a housing defined by the recess of the base and the recess of the upper portion when the base is adjacent to the upper portion; and
a flexible bladder contained within the plurality of removable panels, and comprising an orifice substantially aligned with the hole in the upper horizontal surface.

2. The water storage apparatus of claim 1, further comprising at least one handle.

3. The water storage apparatus of claim 1, wherein the fluid dispenser connected to the hole in the wall of the base is selected from the group consisting of: a spigot and a hose.

4. The water storage apparatus of claim 1, further comprising a removable cap sealing the hole in the upper horizontal surface of the upper portion.

5. The water storage apparatus of claim 1, further comprising a plurality of columns extending from the base to the upper portion interposed between the plurality of panels and configured to fit with the removable panels within the housing defined by the recess of the base and the recess of the upper portion, the columns and the plurality of panels being detachably connectable along longitudinal portions thereof.

6. The water storage apparatus of claim 1, wherein the bladder further comprises an orifice detachably connected to the hole in the wall of the base.

7. The water storage apparatus of claim 1, further comprising a detachable hose connected to the hole in the upper horizontal surface of the upper portion.

8. The water storage apparatus of claim 1, wherein the wheels are removably attached at a lower side of the lower horizontal surface of the base.

9. The water storage apparatus of claim 8, wherein the wheels are configured to fit with the plurality of removable panels within the housing defined by the recess of the base and the recess of the upper portion.

10. The water storage apparatus of claim 1, wherein the base further comprises one or more axels, and wherein a wheel of the base is rotatably coupled to an axel.

11. The water storage apparatus of claim 10, wherein the axel protrudes from a first wall of the base.

12. A water storage apparatus comprising:
a base comprising a lower horizontal surface, one or more wheels attached to the base, a plurality of walls extending upwardly from edges of the lower horizontal surface, thereby forming a recess in the base defined by the walls and the lower horizontal surface, wherein at least one of the plurality of walls has a hole configured to be detachably coupled to a fluid dispenser;
an upper portion comprising an upper horizontal surface having a plurality of walls extending downwardly from edges of the upper horizontal surface, thereby forming a recess in the upper portion defined by the walls of the upper portion and the upper horizontal surface, wherein the upper horizontal surface comprises a hole;
a plurality of removable panels extending from the base to the upper portion forming a chamber defined by the plurality of removable panels, the base, and the upper portion, wherein the removable panels are separable from one another, and are configured to stack upon one another between the base and the upper portion whereby the base is adjacent to a first end of the stack and the upper portion is adjacent to an opposing second end of the stack; and
a flexible bladder contained within the plurality of removable panels, and comprising an orifice substantially aligned with the hole of the upper horizontal surface.

13. The water storage apparatus of claim 12, further comprising at least one handle.

14. The water storage apparatus of claim 12, wherein the fluid dispenser connected to the hole in the wall of the base is selected from the group consisting of: a spigot and a hose.

15. The water storage apparatus of claim 12, further comprising a removable cap sealing the hole in the upper horizontal surface of the upper portion.

16. The water storage apparatus of claim 12, further comprising a plurality of columns extending from the base to the upper portion interposed between the plurality of panels and configured to fit within the housing defined by the recess of the base, the stack of removable panels, and the recess of the upper portion, the columns and the plurality of panels being detachably connectable along longitudinal portions thereof.

17. The water storage apparatus of claim 12, wherein the bladder further comprises an orifice detachably connected to the hole in the wall of the base.

18. The water storage apparatus of claim 12, further comprising a detachable hose connected to the hole in the upper horizontal surface of the upper portion.

19. The water storage apparatus of claim 12, wherein the wheels are removably attached at a lower side of the horizontal surface of the base.

20. The water storage apparatus of claim 19, wherein the wheels are configured to fit within the housing defined by the recess of the base, the stack of removable panels, and the recess of the upper portion.

21. The water storage apparatus of claim 12, wherein the base further comprises one or more axels, and wherein a wheel of the base is rotatably coupled to an axel.

22. The water storage apparatus of claim 21, wherein the axel protrudes from a first wall of the base.

23. The water storage apparatus of claim 1, wherein the plurality of walls of the base include an inner side wall and an outer side wall defining a groove therebetween configured and dimensioned to receive a lower portion of the panels.

24. The water storage apparatus of claim 23, wherein the plurality of walls of the upper portion include an inner side wall and an outer side wall defining a groove therebetween configured and dimensioned to receive an upper portion of the panels.

25. The water storage apparatus of claim 12, wherein the plurality of walls of the base include an inner side wall and an outer side wall defining a groove therebetween configured and dimensioned to receive a lower portion of the panels.

26. The water storage apparatus of claim 25, wherein the plurality of walls of the upper portion include an inner side wall and an outer side wall defining a groove therebetween configured and dimensioned to receive an upper portion of the panels.

27. The water storage apparatus of claim 1, further comprising:
   a first guide member fixedly positioned along a first wall and within the groove along the first wall;
   a second guide member fixedly positioned along a second wall and within the groove along the second wall; and
   a column configured to extend into the grooves along the first wall and the second wall and between the first and second guide members, thereby inhibiting the column from sliding along either the first wall or second wall.

28. The water storage apparatus of claim 27, further comprising:
   first additional guide members and second additional guide members fixedly positioned along adjacent walls and within respective grooves along the adjacent walls; and
   respective columns configured to extend into the grooves along the adjacent walls between the first and second additional guide members, thereby inhibiting the respective columns from sliding along either of the adjacent walls.

29. The water storage apparatus of claim 12, further comprising:
   a first guide member fixedly positioned along a first wall and within the groove along the first wall;
   a second guide member fixedly positioned along a second wall and within the groove along the second wall; and
   a column configured to extend into the grooves along the first wall and the second wall and between the first and second guide members, thereby inhibiting the column from sliding along either the first wall or second wall.

30. The water storage apparatus of claim 29, further comprising:
   first additional guide members and second additional guide members fixedly positioned along each of the adjacent walls and within respective grooves along the adjacent walls; and
   respective columns configured to extend into the grooves along the adjacent walls between the first and second additional guide members, thereby inhibiting the respective columns from sliding along either of the adjacent walls.

31. The water storage apparatus of claim 1, wherein at least one of the removable panels are formed of at least one member inclusive of an opening extending vertically along the at least one of the removable panels to enable a user to visually inspect the flexible bladder to determine a level of fluid within the flexible bladder.

32. The water storage apparatus of claim 12, wherein at least one of the removable panels are formed of at least one member inclusive of an opening extending vertically along the at least one of the removable panels to enable a user to visually inspect the flexible bladder to determine a level of fluid within the flexible bladder.

* * * * *